Nov. 7, 1933.  J. S. MacLEAN  1,933,596
DISPENSING
Filed July 8, 1932
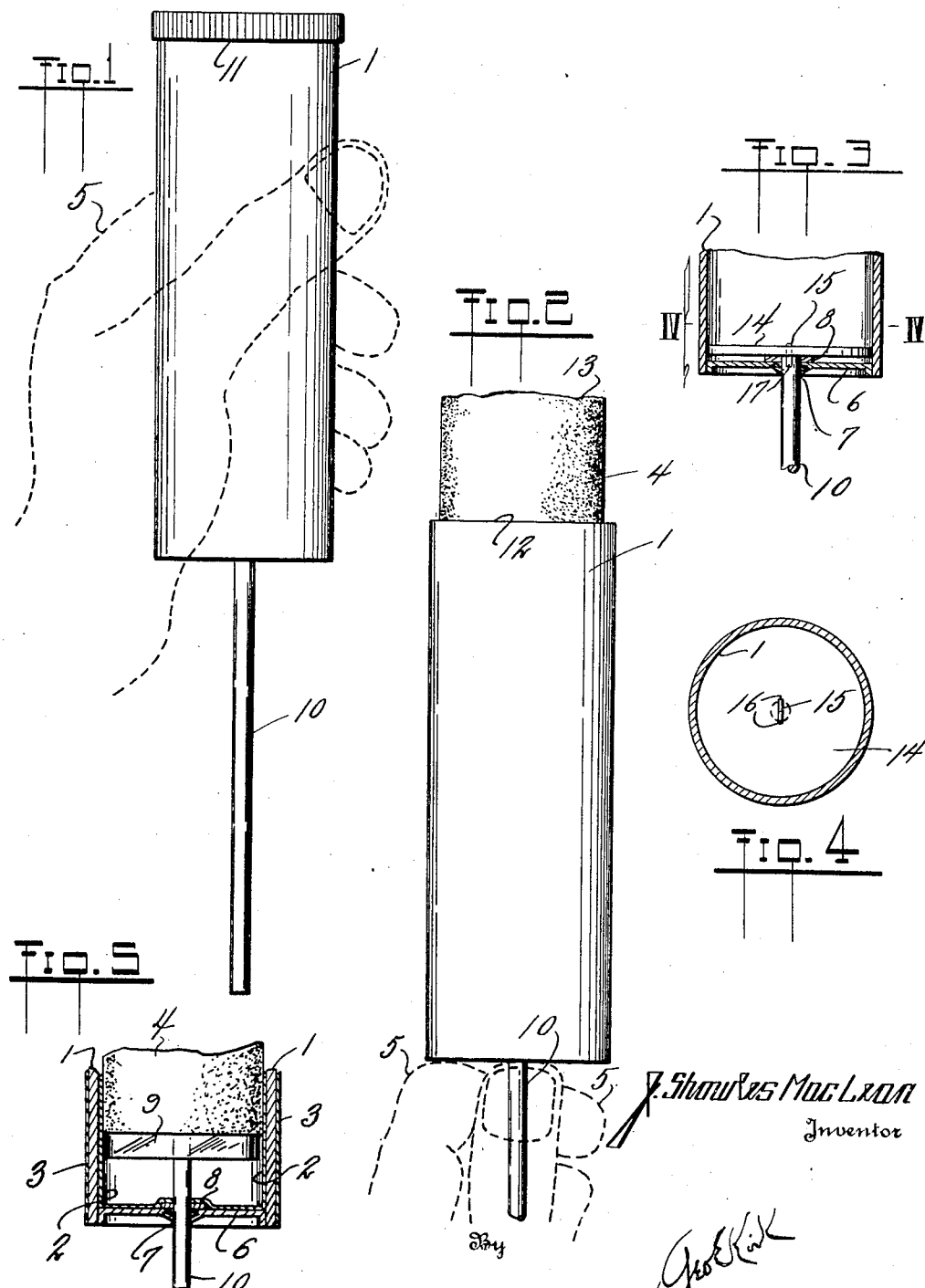

Patented Nov. 7, 1933

1,933,596

UNITED STATES PATENT OFFICE 1,933,596

DISPENSING

J. Showles MacLean, Toledo, Ohio, assignor of one-fourth to Quay Vinson, Toledo, Ohio Application July 8, 1932. Serial No. 621,410

3 Claims. (Cl. 206—56)

This invention relates to dispensing of materials without direct handling thereof.

This invention has utility as a sanitary and cleanly dispenser for foodstuffs, as ice cream, confections, etc.

Referring to the drawing:

Fig. 1 is a view of an embodiment of the invention in a container;

Fig. 2 is a view of the container of Fig. 1 in dispensing position;

Fig. 3 is a fragmentary section of the container at the support terminus;

Fig. 4 is a section on the line IV—IV, Fig. 3, looking in the direction of the arrow; and Fig. 5 is a view similar to Fig. 3, wherein the support may be part of a substance dispensed.

A container provides a way which, as to its extent axially, may be of varied dimension or form, but such is herein shown as cylindrical embodying primarily an intermediate ply 1, say of paper or paper stock having an inner coating 2 and outer coating 3. The inner coating 2 is desirably one which may not react to contaminate charge 4 whether such be a substance which is in a range of foodstuffs or not. Hereunder, however, the primary field had in mind is for foodstuffs, more particularly such as are congealed, as ices and ice cream. This congealed mass is desirably precast to a dimension closely approximating the interior of the container so that there may be a minimum of initial adhesion between the inner coating 2 and the substance 4.

In the event the substance be cast in the container and the substance be one readily yielding to body heat, the one to consume the product may have hand 5 grasp the container which tends to loosen the substance 4 from any tendency to adhere objectionably as to the coating 2.

Outer coating 3 for this container or paper 1 may be of decorative lacquer or be similar to the inner coating 2. The purpose, of course, is that in dispensing the commodity 4 there may be an effective container action in retaining the commodity and having such without contamination of the mass 4; and that the entire handling may be cleanly as to the user so that it may not come off on the hand 5 of the user. This container having the cylindrical way providing wall 1 with the coatings 2, 3, terminally may have head 6 with guide 7. This guide 7 may even be supplemented by washer 8 that the dispensing may be effective against leakage of the mass 4 past support or piston 9 to stem or handle 10. The piston 9 may be a confection, say of chocolate or butter scotch. Accordingly, the one using the device herein and consuming the mass 4, may as a top-off or dessert consume the piston or support 9 by eating such off the stem or handle 10 serving as the piston rod.

With the container or tube 1 empty, the piston 9 should be at its lower end against the head or bottom 6, then the full charge, say of pre-cast ice cream 4 may be introduced and cover 11 as a cap placed thereon. The stem 10 protrudes so that the wall 1 may be an effective insulation to hold the substance at a frozen temperature for a period before being consumed. As consumption is undertaken, the cap 11 is removed.

The operator then may thrust the stem 10 to carry the piston 9 away from the bottom 6 and thus thrust the mass 4 to protrude from open end 12 a desired extent. The user may then eat off the mass 4 to leave a more or less irregular terminus 13 protruding. At any discontinuance of the consumption, the support 9 may be retracted and even the cap 11 replaced to keep the contents sanitary. To effect the extrusion the stem 10 may be placed against a support and the hand 5 grasping the container may thrust the container down along the stem 10 a desired distance. It is thus seen that one hand operation may be effective in this dispenser. When out of use, supports such as openings or rings may be available into which to insert the stems 10 to sustain the containers.

Should it be desired that the support or piston 9 be not a confection, there may be mounted on the stem 10 support 14, say as a paper disk or disk of material similar to the stock 1 of the container, which disk may likewise be coated to avoid contamination of the mass 4. U-shaped clip 15 may pass through spaced openings 16 centrally of the disk 4 and have claw termini 17 of this clip 15 imbedded into the wood stem 10 to effect the anchoring. This stem 10 may conveniently, as a handle, be of wood. Preferably it would not be of a substance which might soil the hands of the user. Accordingly, it might be of paper stock and the substance formed as a unit, by molding the pulp with the stem analogous to the showing of the piston and rod in Fig. 5.

What is claimed and it is desired to secure by Letters Patent is:

1. A piston and cylinder dispensing container, and a piston rod anchored with the piston and protruding from the container to provide a handle for the container, said container having a terminal closure providing a packing fit guide for the rod.

2. A container having a delivery end portion and an opposing guide end portion, a handle through the guide portion into the container and having a packing fit with the guide, and a diaphragm anchored with the handle and providing with the handle a support for container charged material, said diaphragm and handle being shiftable as a unit relatively to the container for thrusting material from the container delivery portion as the handle moves through the guide portion.

3. A package comprising a cylinder for a quantity of food to be dispensed, said cylinder having a guide, a piston rod having packing fit with and extending through said guide and from said cylinder, and an edible piston movable along the cylinder by the piston rod to extrude the food from the cylinder.

J. SHOWLES MacLEAN.